(12) United States Patent
Klatt et al.

(10) Patent No.: US 9,936,371 B2
(45) Date of Patent: Apr. 3, 2018

(54) DISCOVERY MESSAGE TRANSMISSION FOR DEVICE TO DEVICE COMMUNICATION

(71) Applicant: Deutsche Telekom AG, Bonn (DE)

(72) Inventors: Axel Klatt, Cologne (DE); Georg Wannemacher, St. Ingbert (DE)

(73) Assignee: DEUTSCHE TELEKOM AG, Bonn (DE)

( * ) Notice: Subject to any disclaimer, the term of this patent is extended or adjusted under 35 U.S.C. 154(b) by 0 days.

(21) Appl. No.: 14/710,609

(22) Filed: May 13, 2015

(65) Prior Publication Data
US 2015/0334550 A1    Nov. 19, 2015

(30) Foreign Application Priority Data

May 13, 2014   (EP) ..................................... 14168077

(51) Int. Cl.
*H04W 8/00* (2009.01)
*H04W 4/00* (2018.01)
*H04W 4/02* (2018.01)
*H04W 76/02* (2009.01)

(52) U.S. Cl.
CPC ........... *H04W 8/005* (2013.01); *H04W 4/008* (2013.01); *H04W 4/023* (2013.01); *H04W 76/023* (2013.01)

(58) Field of Classification Search
CPC ... H04W 76/023; H04W 8/005; H04W 84/12; H04W 4/008; H04W 4/005; H04W 84/18; H04W 4/023; H04W 76/043; H04W 64/003
See application file for complete search history.

(56) References Cited

U.S. PATENT DOCUMENTS

| | | | | |
|---|---|---|---|---|
| 2011/0085455 A1* | 4/2011 | Wu | ...................... | H04W 72/082 370/252 |
| 2012/0249372 A1* | 10/2012 | Jovicic | .................... | G01S 1/042 342/451 |
| 2014/0150067 A1* | 5/2014 | Salkintzis | ............... | H04L 67/24 726/4 |
| 2014/0198719 A1* | 7/2014 | Vanderveen | ............ | H04L 67/16 370/328 |
| 2014/0241260 A1* | 8/2014 | Schmidt | .............. | H04W 76/023 370/329 |

(Continued)

FOREIGN PATENT DOCUMENTS

| | | |
|---|---|---|
| EP | 1538862 A1 | 6/2005 |
| WO | WO 2013154546 A1 | 10/2013 |
| WO | WO 2014193557 A1 * | 12/2014 ............ H04W 8/005 |

*Primary Examiner* — Daniel Lai
(74) *Attorney, Agent, or Firm* — Leydig, Voit & Mayer, Ltd.

(57) ABSTRACT

A method for transmitting a discovery message for device to device communication from a first user equipment to a second user equipment includes: receiving or generating, by the first user equipment, a position information defining a geographical position; generating, by the first user equipment, the discovery message; and transmitting, by the first user equipment, the discovery message to the second user equipment using a common air interface of the first user equipment and the second user equipment. The discovery message comprises a position information part such that at least a part of the position information is transmitted from the first user equipment to the second user equipment.

17 Claims, 1 Drawing Sheet

(56) References Cited

U.S. PATENT DOCUMENTS

| | | | | |
|---|---|---|---|---|
| 2014/0357269 A1* | 12/2014 | Zhou | .............. | H04W 8/005 |
| | | | | 455/434 |
| 2015/0043448 A1* | 2/2015 | Chatterjee | ............ | H04W 8/005 |
| | | | | 370/329 |
| 2015/0373765 A1* | 12/2015 | Lee | .............. | H04W 8/005 |
| | | | | 370/329 |

* cited by examiner

DISCOVERY MESSAGE TRANSMISSION FOR DEVICE TO DEVICE COMMUNICATION

CROSS-REFERENCE TO RELATED APPLICATIONS

Priority is claimed to European Patent Application No. EP 14168077.7, filed on May 13, 2014, the entire disclosure of which is hereby incorporated by reference herein.

FIELD

The present invention relates to a method for transmitting at least one discovery message for device to device communication.

Furthermore, the present invention relates to a system for transmitting at least one discovery message for device to device communication.

Furthermore, the present invention relates to a user equipment adapted for transmitting at least one discovery message for device to device communication.

Additionally, the present invention relates to a program and to a computer program product for transmitting at least one discovery message for device to device communication.

The present invention addresses, inter alia, a method allowing at least two mobile terminal devices (or user equipments) that are capable of establishing a direct communication link between these devices (or user equipments)—hereinafter called device-to-device communication or device to device communication or D2D communication—to discover each other, i.e. initially exchange information directly between these devices.

BACKGROUND

It is expected that the LTE (Long Term Evolution) system will allow for an increased usage of device to device communication. The LTE system and LTE-A (LTE Advanced) system comprises the Evolved Universal Mobile Telecommunications System (UMTS) Terrestrial Radio Access Network (E-UTRAN), and the Evolved Packet Core (EPC). The E-UTRAN typically comprises a plurality of base station entities, typically referred to as eNBs (evolved NodeBs) for macro-cells and HeNBs (Home-eNBs) for femto-cells, as well as the cellular terminals (or user equipments).

Device to device communication is currently being defined as a work item in the context of 3GPP (Third Generation Partnership Project), Release 12. The basic principle of LTE device to device communication (LTE D2D) is the possibility to allow for a direct communication between at least two devices (or user equipments) supporting a device to device communication mode. Within the context of the device to device communication, standardized in 3GPP, two modes are part of the 3GPP definitions: an infrastructure-based device to device communication mode and a direct device to device communication mode.

A further feature of the device to device communication is the so-called "discovery" functionality which allows at least two device-to-device-communication-enabled devices (or user equipments) to identify each other if these devices (or user equipments) are in the vicinity of each other. Within the context of the so-called "communication" functionality, the at least two device-to-device-communication-enabled devices involved in the discovery are enabled to initiate a direct communication between each other.

The discovery feature is of interest to critical communication users as well as commercial cellular mobile operators in order to explore new business opportunities with targeted mobile advertising as well as supporting the growing trend of social networking where the environment of the current location of the user equipment (i.e. the proximity of the current location) plays a more and more important role. Additionally, device to device communications, and especially proximity services, are likewise interesting for automotive applications in order to establish new services, e.g., for car-to-car communication, traffic management and traffic alert.

The device to device discovery and/or device to device communication allows for direct interactions between at least two devices based on radio resources being allocated to the devices by the supporting mobile communication network. Furthermore, the mobile communication network may comprise a central server for providing location based services to the at least two devices, wherein the use of the location based services typically requires an existing connection between the central server and each of the at least two devices.

SUMMARY

In an embodiment, the present invention provides a method for transmitting a discovery message for device to device communication from a first user equipment to a second user equipment, the first user equipment and the second user equipment being enabled to use a device to device communication mode (D2D mode) including proximity detection and/or discovery, wherein the method comprises: receiving or generating, by the first user equipment, a position information defining a geographical position; generating, by the first user equipment, the discovery message; and transmitting, by the first user equipment, the discovery message to the second user equipment using a common air interface of the first user equipment and the second user equipment. The discovery message comprises a position information part such that at least a part of the position information is transmitted from the first user equipment to the second user equipment.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
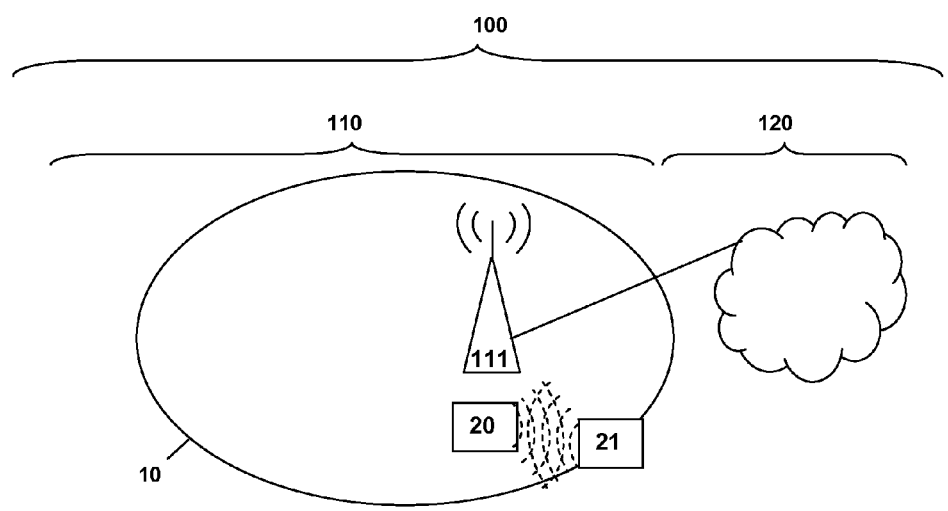
FIG. 1 schematically illustrates a system according to the present invention.

In an embodiment, the present invention provides a technically simple, effective and especially cost effective solution for transmitting at least one discovery message for device to device communication, wherein location based services are provided with relatively high reliability and improved user friendliness, in particular such that location based services may be used by the devices independent of a connection to the mobile communication network.

In an embodiment, the present invention provides a method for transmitting at least one discovery message for device to device communication from a first user equipment to at least one second user equipment, the first user equipment and the second user equipment being enabled to use a device to device communication mode (D2D mode) including proximity detection and/or discovery, wherein the method comprises the following steps:

in a first step, the first user equipment receives or generates a position information, wherein the position information defines a geographical position, in a second step, subsequent to the first step, the discovery message is generated by the first user equipment and transmitted using a common air interface of the first user equipment and the second user equipment, wherein the discovery message comprises a position information part such that, upon reception of the discovery message by the second user equipment, at least a part of the position information is transmitted from the first user equipment to the second user equipment.

It is thereby advantageously possible to transmit the position information part as part of the discovery message to the second user equipment (or the at least one second user equipment) independent of a connection of the first or second user equipment to a mobile communication network, e.g. a public land mobile network (PLMN). In particular, the transmission of the position information part by using the device to device communication mode enables the direct exchange of position related information between the first and second user equipment without any involvement of external network elements of the mobile communication network, e.g. network elements of a Radio Access Network (RAN) of the PLMN.

In an embodiment, the position information is provided—within the discovery message—as an IE Ellipsoid-Point according to the specification 3GPP 23.032. According to this specification, the coordinates of an ellipsoid point are coded with an uncertainty of less than 3 meters. The latitude is coded with 24 bits: 1 bit of sign and a number between 0 and $2^{23}-1$ coded in binary on 23 bits. The relation between the coded number N and the range of (absolute) latitudes X it encodes is the following (X in degrees):
N is smaller or equal to $X*2^{23}/90$, which is smaller or equal to N+1,
except for $N=2^{23}-1$, for which the range is extended to include N+1.
The longitude, expressed in the range −180°, +180°, is coded as a number between $-2^{23}$ and $2^{23}-1$, coded in 2's complement binary on 24 bits. The relation between the coded number N and the range of longitude X it encodes is the following (X in degrees):
N is smaller or equal to $X*2^{24}/360$, which is smaller or equal to N+1.

In an embodiment, the first user equipment and the second user equipment are enabled to use the device to device communication mode (D2D mode), wherein the D2D mode includes at least one of proximity detection, device to device discovery and/or device to device communication.

In an embodiment, upon reception of the discovery message by the second user equipment, at least a part of the position information is transmitted from the first user equipment to the second user equipment even in case that both the first and second user equipment are out of radio coverage of a mobile communication network.

Thereby, it is advantageously possible to transmit the position information part as part of the discovery message to the second user equipment even if no mobile communication coverage is available to the first and second user equipment—which is, in particular, also called "Out-of-Coverage".

In an embodiment, the discovery message comprises in total less than 416 bits, preferably less than 208 bits, still more preferably 192 bits or 128 bits or 104 bits. In an embodiment, the discovery message is logically one data unit, e.g., a service data unit (SDU), which has in total preferably a length as indicated but can be transmitted on the air interface using one or more resource blocks (in case that the number of bits of the discovery message exceeds the number of available bits per resource block).

Thereby, it is advantageously possible to reduce the network traffic associated with the transmission of the position information to a minimum such that the second user equipment receives position information even in case of limited radio resources being allocated to the first and second user equipment by the supporting mobile communication network.

In an embodiment, the position information comprises at least the latitude of the geographical position and the longitude of the geographical position, e.g., in the form of geo-coordinates.

Thereby, it is advantageously possible to determine, by the second user equipment, the absolute location, e.g. of the first user equipment, indicated by the position information upon reception of the discovery message. Preferably, the second user equipment determines its absolute location information autonomously—i.e. without any involvement of external systems or solely by using means integrated in the second user equipment such as a navigation system, preferably a Global Navigation Satellite System (GNSS), e.g. the Global Positioning System (GPS).

In an embodiment, the position information comprises, besides the latitude of the geographical position and the longitude of the geographical position, at least one out of the following:
an altitude of the geographical position,
a speed information indicating a speed,
a heading information indicating a direction of travel.

Thereby, it is advantageously possible to provide, to the second user equipment, relatively detailed information about an object at a position indicated by the position information.

In an embodiment, the discovery message comprises an identification information, identifying the first user equipment.

Thereby, it is advantageously possible for the second user equipment to identify the first user equipment such that the second user equipment is enabled to relate the identity information to the position information. Preferably, the second user equipment displays a map depending on the position information, the identification information and/or a relation between the position information and the identification information.

In an embodiment, the discovery message comprises, besides the position information part, an indication that the discovery message comprises a position information part.

Thereby, it is advantageously possible to indicate to the second user equipment that the discovery message comprises the position information part such that the second user equipment is enabled to distinguish upon reception of the discovery message whether the position information part is included or not.

In an embodiment, in a third step, prior to the first step, the first user equipment receives another discovery message from the second user equipment, wherein the other discovery message comprises a request information, the request information triggering the transmission of the discovery message by the first user equipment.

Thereby, it is advantageously possible to transmit the position information part from the first user equipment to the second user equipment upon request from the second user equipment. Thereby, it is furthermore advantageously possible that a user of the second user equipment is enabled to determine if, when and/or where the position information part shall be received from the first user equipment.

In an embodiment, the discovery message comprises an expression according to the 3GPP Proximity Services (ProSe) standard and/or the discovery message comprises, besides the expression, a header information, wherein the header information comprises at least a part of the position information and/or the discovery message comprises, besides the expression and the header information, an additional information, wherein the additional information comprises at least a part of the position information.

Thereby, it is advantageously possible to use the expression according to the 3GPP Proximity Services (ProSe) standard for device to device communication such that a direct discovery is enabled between the first and second user equipment independent of a connection of the first and/or second user equipment to the mobile communication network. Preferably, the expressions are used in public safety scenarios in order to exchange position information directly within a discovery procedure executed in the device to device communication mode rather than establishing a device to device communication connection between the first and second user equipment and/or using the mobile communication network. Therefore, it is advantageously possible to transmit the position information in a relatively simple, fast and reliable manner from the first to the second user equipment.

In case that the discovery message comprises an expression according to the 3GPP Proximity Services (ProSe) standard, it is preferred that the discovery message comprises, besides the expression, a header information. It is preferred according to an embodiment of the present invention that the position information is part of or included in the header information (i.e. as part of the discovery message). This means, in particular, that the position information is—according to such an alternative—not part of or excluded from the expression of the discovery message, i.e. excluded from the expression part of the discovery message. According to an alternative preferred embodiment, the position information is not part of the header information (of the discovery message) but part of the expression (of the discovery message). According to still another alternative embodiment, a position information is part of both the header information (of the discovery message), and of the expression (of the discovery message).

In case that the discovery message comprises an expression according to the 3GPP Proximity Services (ProSe) standard, it is furthermore preferred that the discovery message comprises, besides the expression and the header information, an additional information. According to such an embodiment, a position information is neither part of the header information (of the discovery message), nor part of the expression (of the discovery message), but part of the additional information of the discovery message. However, it is possible according to the present invention that a position information is part both of the additional information (of the discovery message), and of one or both of the header information (of the discovery message) and the expression (of the discovery message).

In an embodiment, the second user equipment comprises display capabilities such that the second user equipment has the capability to indicate the received position information from the first user equipment on an electronic map using the display capabilities.

Thereby, it is advantageously possible according to the present invention that the second user equipment is able to display the position of the first user equipment in a convenient manner. Especially in case that a plurality of first user equipments are transmitting their respective position information by means of transmitting the discovery message, it is possible to display, at the second user equipment, the positions directly transmitted by the plurality of first user equipments (i.e. without the need of any network coverage neither for the second user equipment, nor for one of the first user equipments).

Furthermore, the present invention relates to a system for transmitting at least one discovery message for device to device communication from a first user equipment to at least one second user equipment, the system comprising the first user equipment and the second user equipment, the first user equipment and the second user equipment being enabled to use a device to device communication mode (D2D mode) including proximity detection and/or discovery, wherein the system is configured such that:

the first user equipment receives or generates a position information, wherein the position information defines a geographical position, the discovery message is generated by the first user equipment and transmitted using a common air interface of the first user equipment and the second user equipment, wherein the discovery message comprises a position information part such that, upon reception of the discovery message by the second user equipment, at least a part of the position information is transmitted from the first user equipment to the second user equipment.

It is thereby advantageously possible to provide a system for transmitting at least one discovery message for device to device communication from a first user equipment to at least one second user equipment, wherein location based services are provided to the user equipments independent of a connection to the mobile communication network, i.e. even in case that the first and/or second user equipment are not under coverage of a mobile communication network.

Furthermore, the present invention relates to a user equipment adapted for transmitting at least one discovery message for device to device communication to at least one second user equipment, the user equipment and the second user equipment being enabled to use a device to device communication mode (D2D mode) including proximity detection and/or discovery, wherein the user equipment is configured such that:

the user equipment receives or generates a position information, wherein the position information defines a geographical position, the discovery message is generated by the user equipment and transmitted using a common air interface of the user equipment and the second user equipment, wherein the discovery message comprises a position information part such that, upon reception of the discovery message by the second user equipment, at least a part of the position information is transmitted from the user equipment to the second user equipment.

It is thereby advantageously possible to provide a user equipment adapted for transmitting at least one discovery message for device to device communication to at least one second user equipment, wherein the user equipment makes use of a location based service independent of a connection to the mobile communication network, i.e. even in case that the user equipment is not under coverage of a mobile communication network.

According to a preferred embodiment—in particular of the user equipment—of the present invention, the user equipment comprises a GNSS module (Global Navigation Satellite System module, e.g. a Global Positioning System GPS) by means of which the position information is generated.

Thereby, it is advantageously possible to generate the position information independently of external conditions such as network coverage of the mobile communication network.

Additionally, the present invention relates to a program comprising a computer readable program code which, when executed on a computer or on a first user equipment or a second user equipment, or in part on the first user equipment and in part on the second user equipment, causes the computer or the first user equipment or the second user equipment to perform the inventive method.

Additionally, the present invention relates to a computer program product for using a user equipment with a base transceiver station, the computer program product comprising a computer program stored on a storage medium, the computer program comprising program code which, when executed on a computer or on a first user equipment or a second user equipment, or in part on the first user equipment and in part on the second user equipment, causes the computer or the first user equipment or the second user equipment to perform the inventive method.

These and other characteristics, features and advantages of the present invention will become apparent from the following detailed description, taken in conjunction with the accompanying drawings, which illustrate, by way of example, the principles of the invention. The description is given for the sake of example only, without limiting the scope of the invention. The reference figures quoted below refer to the attached drawings.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes.

Where an indefinite or definite article is used when referring to a singular noun, e.g. "a", "an", "the", this includes a plural of that noun unless something else is specifically stated.

Furthermore, the terms first, second, third and the like in the description and in the claims are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

Figure 2:
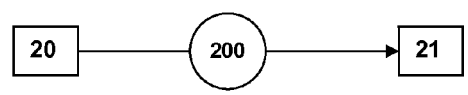
FIG. 2 schematically illustrates a discovery message for device to device communication.

In FIG. 1, a system according to the present invention is schematically illustrated, wherein the system comprises a first user equipment 20 and at least one second user equipment 21. The system is configured for transmitting at least one discovery message 200 (which is illustrated in FIG. 2) for device to device communication from the first user equipment 20 to the at least one second user equipment 21.

Furthermore, the system optionally comprises a mobile communication network 100, especially a public land mobile network (PLMN). The mobile communication network 100 comprises an access network 110 and a core network 120. The mobile communication network 100 is preferably a cellular telecommunications network comprising typically a plurality of network cells, wherein one network cell is represented in FIG. 1 by means of reference sign 10. The first user equipment 20 and/or the at least one second user equipment 21 is/are preferably camping on the mobile communication network 100 within the network cell 10, i.e. the first user equipment 20 and/or the at least one second user equipment 21 are connected to or camping on a base station entity 111 serving the cell 10. According to a preferred embodiment of the present invention, the mobile communication network 100 is configured to allocate radio resources to the first user equipment 20 and/or to the at least one second user equipment 21 for use of the radio resources by the first user equipment 20 and/or the at least one second user equipment 21 for device to device discovery and/or device to device communication. The first user equipment 20 and the second user equipment 21 are enabled to use a device to device communication mode (D2D mode) including proximity detection and/or discovery and/or device to device communication.

According to an embodiment of the present invention, the system is configured such that the first user equipment 20 generates position information, wherein the position information defines a geographical position. Preferably, the first user equipment 20 is configured to generate the position information such that the position information is related to a position of the first user equipment 20. For example, the position information is configured to indicate a geographical location in form of geographical coordinates. According to an alternative embodiment of the present invention, the system is configured such that the first user equipment 20 receives the position information. Preferably, the position information received by the first user equipment 20 is configured such that the position information is related to a specific position (of, e.g., another object or of another location)—for example a geographical position of another user equipment, a dangerous zone or any location different from the location of the first user equipment 20, such as a location of which a picture is taken by the first user equipment 20.

Typically, the position information is generated—within the first user equipment 20, typically by using a GNSS module within the first user equipment 20—by capabilities of the first user equipment 20 to receive radio signals of a Global Navigation Satellite System and to transform these signals into a position information to be transmitted.

According to the present invention, the system is configured such that the discovery message 200 is generated by the first user equipment 20 and transmitted using a common air interface of the first user equipment 20 and the second user equipment 21.

Preferably, the common air interface relates to the radio resources being allocated by the mobile communication network 100 for the device to device communication. The discovery message 200 is configured by the user equipment 20 such that the discovery message 200 comprises a position information part such that, upon reception of the discovery message 200 by the second user equipment 21, at least a part of the position information is transmitted from the first user equipment 20 to the second user equipment 21. This means, in particular, that the second user equipment 21 determines the position information depending on one or a plurality of discovery messages received from the first user equipment 20. According to a preferred embodiment of the present invention, the position information is used for public safety purposes, wherein the second user equipment 21 uses the position information received from the first user equipment to indicate the current location of the first user equipment on an electronic map (typically using the display capabilities of the second user equipment 21) in order to allow a user of the second user equipment 21—e.g. a supervisor—to see immediately where the user of the first user equipment 20 is located.

Additionally, it is preferred according to the present invention that the position information is provided from a single user equipment (e.g. the first user equipment 20) to a plurality of nearby devices (e.g. the at least one second user equipment 21) without any involvement of the mobile communication network 100.

Of course, it is possible and intended according to the present invention that not only one first user equipment 20 sends one discovery message 200 or a plurality of discovery messages 200 but that a plurality of first user equipments 20 is present in the vicinity of the second user equipment 21 (i.e. in such proximity that the radio signal of the discovery message 200 reaches the second user equipment 21) that the second user equipment 21 receives respective discovery messages 200 from the plurality of first user equipments 20.

In FIG. 2, a discovery message 200 for device to device communication is schematically illustrated. Preferably, the discovery message 200 is an expression for direct device to device discovery, i.e. an expression according to the 3GPP Proximity Services (ProSe) standard. According to a preferred embodiment of the present invention, the first user equipment 20 and the at least one second user equipment 21 are configured to generate and/or analyse the discovery message 200, wherein the discovery message 200 comprises an expression or is the expression which is structured according to a predefined message structure—i.e. such that the expression contains geographical position information of the device (i.e. the first user equipment 20) sending the expressions. Preferably, the discovery message 200 comprises an indication element, e.g. at least one Bit (Binary Digit) indication element, indicating that the discovery message 200 comprises the position information, e.g. a geographical location information, transmitted by the first user equipment 20.

Preferably, the discovery message 200 further comprises a defined number of bits representing an identity of the first user equipment 20 (identification information). Preferably, the identification information is assigned to the first user equipment 20 by the mobile communication network 100 or by any other user equipment according to the present invention by a configuration step performed at least at the second user equipment 21 that receives the discovery message 200 (and needs to interpret the discovery message 200).

According to a preferred embodiment of the present invention, the system is adapted to perform a configuration procedure for the configuration of the first user equipment 20 and/or the at least one second user equipment 21, wherein, in the configuration procedure, a configuration message is sent to the first user equipment 20 and/or the at least one second user equipment 21. The configuration message is preferably either a message sent from the mobile communication network 100 to the first and/or at least one second user equipment 20, 21 or a discovery message 200 sent from any user equipment according to the present invention. Preferably, the configuration message is configured to indicate to the first and/or at least one second user equipment 20, 21 that direct geographical location information exchange is enabled or that direct geographical location information exchange is disabled.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for device to device communication between a first user equipment and a second user equipment, the first user equipment and the second user equipment being enabled to use a device to device communication mode (D2D mode) including proximity detection and/or discovery, wherein the method comprises:
   receiving, by the first user equipment, a configuration message indicating whether or not direct geographical location information exchange is enabled;
   receiving, by the first user equipment, a first discovery message from the second user equipment, wherein the first discovery message comprises a request for position information of the first user equipment;
   generating, by the first user equipment, in response to the request for position information in the first discovery message and based on the configuration message indicating that direct geographical location information exchange is enabled, a second discovery message comprising position information of the first user equipment, wherein the position information comprises at least one out of the following: altitude information, speed information, or heading information; and
   transmitting, by the first user equipment, the second discovery message to the second user equipment using a common air interface of the first user equipment and the second user equipment so as to enable a D2D communication link between the first user equipment and the second user equipment.

2. The method according to claim 1, wherein both the first and second user equipment are out of radio coverage of a mobile communication network.

3. The method according to claim 1, wherein the position information comprises at least a latitude of the geographical position and a longitude of the geographical position in the form of geo-coordinates.

4. The method according to claim 1, wherein the second discovery message comprises identification information identifying the first user equipment.

5. The method according to claim 1, wherein the second discovery message further comprises an indication that the discovery message comprises a position information part.

6. The method according to claim 1, wherein the second discovery message comprises information according to the 3GPP Proximity Services (ProSe) standard.

7. The method according to claim 6, wherein the second discovery message further comprises header information, wherein the header information comprises at least a part of the position information.

8. The method according to claim 6, wherein the second discovery message further comprises additional information, wherein the additional information comprises at least a part of the position information.

9. The method according to claim 1, wherein the second user equipment is configured to indicate position information received from the first user equipment on an electronic map.

10. The method according to claim 1, wherein both the first and second user equipment are out of radio coverage of a mobile communication network; and
 wherein the second discovery message comprises identification information identifying the first user equipment.

11. The method according to claim 1, wherein the second discovery message comprises identification information identifying the first user equipment; and
 wherein the second discovery message comprises information according to the 3GPP Proximity Services (ProSe) standard.

12. The method according to claim 1, wherein both the first and second user equipment are out of radio coverage of a mobile communication network; and
 wherein the second discovery message comprises information according to the 3GPP Proximity Services (ProSe) standard.

13. The method according to claim 1, wherein both the first and second user equipment are out of radio coverage of a mobile communication network;
 wherein the second discovery message comprises identification information identifying the first user equipment; and
 wherein the second discovery message comprises information according to the 3GPP Proximity Services (ProSe) standard.

14. A system for device to device communication between a first user equipment and a second user equipment, the system comprising:
 the first user equipment; and
 the second user equipment;
 wherein the first user equipment and the second user equipment are enabled to use a device to device communication mode (D2D mode) including proximity detection and/or discovery;
 wherein the first user equipment is configured to receive a configuration message indicating whether or not direct geographical location information exchange is enabled;
 wherein the second user equipment is configured to send a first discovery message to the first user equipment, wherein the first discovery message comprises a request for position information of the first user equipment;
 wherein the first user equipment is configured to generate, in response to the request for position information in the first discovery message and based on the configuration message indicating that direct geographical location information exchange is enabled, a second discovery message comprising position information of the first user equipment, wherein the position information comprises at least one out of the following: altitude information, speed information, or heading information; and transmit the second discovery message to the second user equipment using a common air interface of the first user equipment and the second user equipment so as to enable a D2D communication link between the first user equipment and the second user equipment.

15. A user equipment for device to device communication with a second user equipment, the user equipment and the second user equipment being enabled to use a device to device communication mode (D2D mode) including proximity detection and/or discovery, wherein the user equipment comprises a processor and a non-transitory computer-readable medium having processor-executable instructions stored thereon, wherein the processor is configured to execute the processor-executable instructions to facilitate:
 receiving a configuration message indicating whether or not direct geographical location information exchange is enabled;
 receiving a first discovery message from the second user equipment, wherein the first discovery message comprises a request for position information of the first user equipment;
 generating, in response to the request for position information in the first discovery message and based on the configuration message indicating that direct geographical location information exchange is enabled, a second discovery message comprising position information of the first user equipment, wherein the position information comprises at least one out of the following: altitude information, speed information, or heading information; and
 transmitting the second discovery message to the second user equipment using a common air interface of the user equipment and the second user equipment so as to enable a D2D communication link between the first user equipment and the second user equipment.

16. The user equipment according to claim 15, wherein the user equipment comprises a Global Navigation Satellite System (GNSS) module configured to generate the position information.

17. A non-transitory processor-readable medium having processor-executable instructions stored thereon for device to device communication between a first user equipment and a second user equipment, the first user equipment and the second user equipment being enabled to use a device to device communication mode (D2D mode) including proximity detection and/or discovery, wherein the processor-executable instructions, when executed, facilitate the following:
 receiving, by the first user equipment, a configuration message indicating whether or not direct geographical location information exchange is enabled;
 receiving, by the first user equipment, a first discovery message from the second user equipment, wherein the first discovery message comprises a request for position information of the first user equipment;

generating, by the first user equipment, in response to the request for position information in the first discovery message and based on the configuration message indicating that direct geographical location information exchange is enabled, a second discovery message comprising position information of the first user equipment, wherein the position information comprises at least one out of the following: altitude information, speed information, or heading information; and transmitting, by the first user equipment, the second discovery message to the second user equipment using a common air interface of the first user equipment and the second user equipment so as to enable a D2D communication link between the first user equipment and the second user equipment.

* * * * *